US009673565B1

(12) United States Patent
Lowas, III

(10) Patent No.: US 9,673,565 B1
(45) Date of Patent: Jun. 6, 2017

(54) SERIAL BUS UTILITY STRAP

(71) Applicant: Albert Frank Lowas, III, Alexandria, VA (US)

(72) Inventor: Albert Frank Lowas, III, Alexandria, VA (US)

( * ) Notice: Subject to any disclaimer, the term of this patent is extended or adjusted under 35 U.S.C. 154(b) by 0 days.

(21) Appl. No.: 15/143,585

(22) Filed: May 1, 2016

(51) Int. Cl.

| | |
|---|---|
| ***H01R 31/06*** | (2006.01) |
| ***F21V 23/06*** | (2006.01) |
| ***H02G 3/20*** | (2006.01) |
| ***H01R 13/60*** | (2006.01) |
| ***H01R 13/72*** | (2006.01) |
| ***H01R 24/64*** | (2011.01) |
| ***A45F 5/00*** | (2006.01) |
| ***A44B 13/00*** | (2006.01) |
| ***A44B 18/00*** | (2006.01) |
| ***A44B 11/25*** | (2006.01) |
| ***A44B 17/00*** | (2006.01) |
| ***A44B 1/00*** | (2006.01) |
| *H01R 107/00* | (2006.01) |

(52) U.S. Cl.
CPC ............... *H01R 13/60* (2013.01); *A44B 1/00* (2013.01); *A44B 11/25* (2013.01); *A44B 13/00* (2013.01); *A44B 13/0058* (2013.01); *A44B 17/00* (2013.01); *A44B 18/00* (2013.01); *A45F 5/00* (2013.01); *H01R 13/72* (2013.01); *H01R 24/64* (2013.01); *H01R 31/06* (2013.01); *A45F 2005/002* (2013.01); *A45F 2005/006* (2013.01); *H01R 2107/00* (2013.01)

(58) Field of Classification Search
CPC ......... H01R 31/06; H01R 31/02; F21V 23/06; F21V 21/02; H02G 3/20; F21S 8/065
USPC ................................... 439/37, 502, 529–531
See application file for complete search history.

(56) References Cited

U.S. PATENT DOCUMENTS

| | | | | |
|---|---|---|---|---|
| 4,655,531 | A * | 4/1987 | Delaney | H01R 13/6392 439/450 |
| 4,690,476 | A * | 9/1987 | Morgenrath | H01R 13/6392 439/369 |
| 4,917,626 | A * | 4/1990 | Barton | H01R 13/6392 439/369 |
| 6,626,009 | B1 * | 9/2003 | Ohlund | A44C 15/0015 24/614 |
| 6,781,230 | B2 * | 8/2004 | Tsukamoto | H01R 12/592 257/690 |
| 7,186,137 | B2 * | 3/2007 | Rock | 439/101 |
| 7,618,260 | B2 * | 11/2009 | Daniel | A44C 5/0007 24/311 |
| 2014/0057487 | A1 * | 2/2014 | May | H01R 13/60 439/530 |

* cited by examiner

*Primary Examiner* — Gary Paumen

(57) ABSTRACT

A utility strap with embedded serial bus wires is provided. The utility strap is comprised of a flexible elongated strap member with each of the first and second ends having at least one of a ring, hook-and-loop fastening system, button hole, loop, grommet, and a carabiner. Serial bus wires are incorporated within said strap along a significant portion of the length of the strap, said wires forming a serial bus cable with exposed serial bus connectors for providing an electrical connection between two computer devices, peripherals, or other similar electronic devices.

1 Claim, 6 Drawing Sheets

SERIAL BUS UTILITY STRAP

FIELD OF THE INVENTION

This invention relates to a serial bus cable for connecting an external electronic apparatus such as a mobile phone with a serial bus port of a Personal Computer (PC) or other electronic or electrical device. More particularly the invention relates to a serial bus cable which is incorporated within and supported by an elongated strap, said strap being useful for one or more of a variety of purposes related to carrying, binding, and securing items.

BACKGROUND

Increasingly, PCs and other electronic devices have one or more serial bus ports as a standard specification. Peripherals of all types typically contain a serial bus port for connection to PCs, tablets, and other computing devices. Universal Serial Bus (USB) ports are increasingly standard for power and data connections to mobile telephones and other electronic devices. Power outlets and batteries are now commonly designed to contain USB ports and to use these USB ports to provide Direct Current (DC) power for mobile telephones and other electronic devices.

A method for supplying DC power to a display device through a USB port is disclosed in Japanese Patent Publication No. JP10-326128. A method for supplying DC power to a mobile phone through a USB port is disclosed in U.S. Patent Publication No. U.S. Pat. No. 6,211,649 B1. An adaptor for providing a source of DC power to a mobile device through a serial bus port is disclosed in U.S. Patent Publication No. U.S. Pat. No. 7,239,111 B2. A method for communicably connecting two electronic devices with a USB cable is disclosed in U.S. Patent Publication No. U.S. Pat. No. 7,525,046 B2. Methods and apparatus for providing automatic high speed data connection for portable devices with a FireWire (IEEE Standard 1394) serial bus are disclosed in U.S. Patent Publication No. U.S. Pat. No. 7,451,250 B2.

The ubiquitous nature of serial bus devices requires the routine use of dedicated serial bus connection cables, as these connection cables are typically not integral portions of the serial bus devices. Because many of these devices are designed to be mobile, this evolving serial bus standard therefore creates a need for users to routinely carry serial bus cables, or to repeatedly find or purchase serial bus cables.

Various approaches are used to solve the problem of conveniently carrying serial bus cables. One approach is to construct serial bus cables that have the size and shape of a commonly and conveniently carried item, such as a credit card, a collapsing pocket knife, or a door key. In some approaches, a serial bus cable is combined into another useful article, such as a key chain or a bracelet. U.S. Patent Publication No. U.S. Pat. No. 8,758,045 B2 combines a serial bus cable into a carabiner.

Utility straps are commonly used by persons who are traveling between locations. Utility straps are often used for carrying loads, such as to carry multiple bags, to attach loads to back packs, or to carry other accoutrements. Some utility straps are used to secure loads, such as to keep items safely within a bicycle's basket by connecting the utility strap across the top rails of the basket. Some utility straps are used to bind items together, such as to wrap a bundled electrical cable. Some utility straps contain features enabling them to be used for specific purposes such as attaching multiple luggage items to each other.

A multi-purpose utility strap is disclosed in U.S. Patent Publication No. U.S. Pat. No. 8,458,864 B1. A load-bearing utility strap for securing large articles and vehicles is disclosed in U.S. Patent Publication No. U.S. Pat. No. 6,637,077 B2. A utility strap for holding one piece of luggage to another is disclosed in U.S. Patent Publication No. U.S. Pat. No. 5,927,450 A. A method for connecting three luggage items with a utility strap is disclosed in U.S. Patent Publication No. US20060102672 A1.

Some practitioners have recognized some of the benefits of incorporating an electronic connector into a load-bearing higher assembly. U.S. Patent Publication No. U.S. Pat. No. 8,758,045 B2 is an example of this approach. A method for combining a portable electronic device lanyard with an earpiece cable is disclosed in U.S. Patent Application Publication 20140185856 A1. A method for integrating a cable with the webbing of a load-carrying vest is disclosed in U.S. Patent Application Publication No. 20120045929 A1.

As demonstrated by these samples of U.S. and international publications, the availability of serial bus cables remains a persistent problem in the state of the art of electronic and electrical devices. No device within the current art solves this problem through the innovative approach of combining the serial bus cable with a utility strap. Those skilled in the related arts will note that the approach of combining the functionality of a serial bus cable with a utility strap is particularly challenging as it requires developing a solution which will carry a tensile load along the elongated strap without over-stressing the serial bus connectors at the ends of the serial bus cable.

SUMMARY

The present invention provides a new and improved means for carrying a serial bus cable by combining that serial bus cable with a utility strap. It is a more particular object of the present invention for the serial bus cable to be enclosed within, incorporated within, or supported by a utility strap in such a way that the two form a single assembly. It is a still more particular object of the present invention that the serial bus cable wires extend along a significant portion of the length of the elongated strap. These serial bus wires combine with the serial bus electrical connectors to function as a serial bus cable of sufficient length for connecting electrical or electronic devices. The serial bus utility strap assembly of this invention is particularly suited to persons who frequently travel or change locations. This invention gives those persons a convenient method for carrying or securing objects while moving between locations, for carrying a serial bus cable between locations, and for accessing the serial bus cable for use at various locations.

The serial bus utility strap contains features which enable it to function as a common utility strap. These features specifically include a load-bearing elongated strap member and the provision of a fastening means at each end of the elongated strap. The elongated strap member enables the transfer of a tensile force along its length. This elongated strap member may comprise of one or more elements or layers. To facilitate the binding or carrying of objects, each of the two ends of the serial bus utility strap is provided with a load-bearing fastening means. The invention thus enables a person to carry an accoutrement or other load, to bind an object or group of objects, or to secure an item or group of items. Example loads which may be carried by a serial bus utility strap include luggage, bags, and boots. Examples of objects which may be bound by a serial bus utility strap include a bundled electrical power cord, a bundle of socks or stockings, or a rolled sleeping bag.

The serial bus utility strap also functions as a common serial bus cable. To perform this function, the serial bus utility strap is provided with electrically conductive wires and two electrical connectors. The electrical wires may be arranged individually and essentially in parallel with each other, as a single bundle held together within a protective cable core or cable jacket material, or as a combination of individual and bundled wires. The first of the two electrical connectors is electrically bonded to the first end of each of the electrical wires, and the second electrical connector is electrically bonded to the second end of each of the electrical wires. These electrical connectors are readily accessible for the user to connect to external electrical or electronic devices. In some embodiments, one or more of these electrical connectors complies in whole or in part with the USB design standards. In some embodiments, one or more of these electrical connectors complies in whole or in part with the FireWire design standard (IEEE Standard 1394).

A feature of the invention of a serial bus utility strap is that each fastening means is distinct from and separate from the electrical connectors of the assembly. Examples of these fastening means include but are not limited to rings, grommets, hooks, loops, button holes, buckles, and the hook-and-loop fastener system (e.g. Velcro®). The serial bus utility strap invention thus enables a tensile force to be carried along the length of the assembly without excessively stressing the necessary electrically conductive path between the assembly's electrical connectors and the assembly's electrical wires. This innovative combination of load-bearing and electrical features is thus arranged to provide a unique and practical means to combine two otherwise separate elements which are both commonly used by persons who travel between locations.

BRIEF DESCRIPTION OF THE DRAWINGS

The accompanying drawings, which are incorporated in and constitute a part of this disclosure, illustrate three embodiments of the present invention. In the drawings.

DETAILED DESCRIPTION

Figures 1A, 1B:
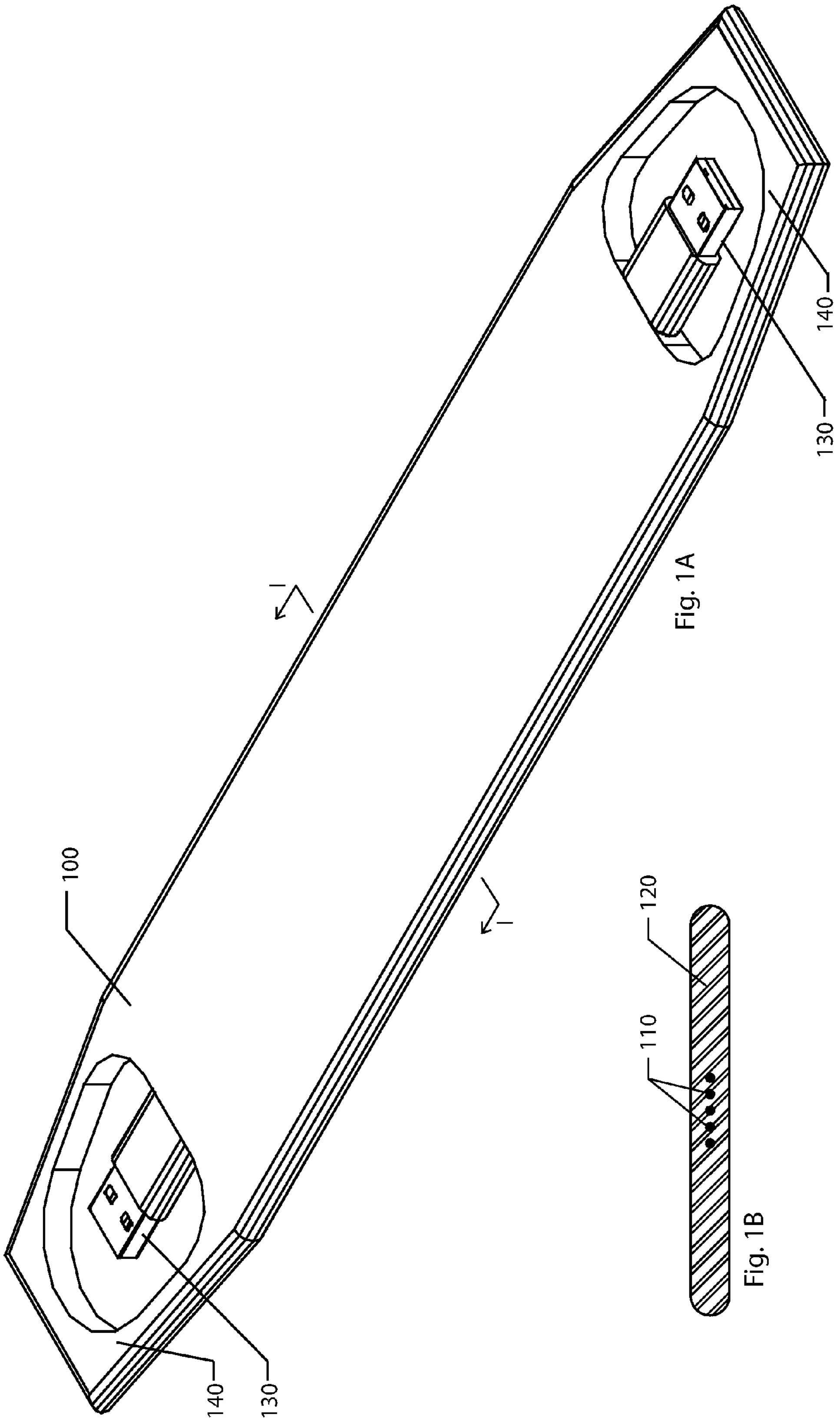
FIG. 1A shows an isometric view of a first embodiment of a serial bus utility strap.
FIG. 1B shows a cross-sectional view of the serial bus utility strap assembly shown in FIG. 1A, with the cross-section taken along the line I-I.

The present disclosure is described more fully hereinafter with reference to the accompanying drawings, in which various aspects of six embodiments of a serial bus utility strap are shown. While six example embodiments of the invention may be described in the drawings and the following description, those skilled in the arts of serial bus cable design and flexible utility strap design will readily recognize that adaptations, modifications, alterations, and other implementations are possible. Therefore, the following detailed description does not limit the invention.

Where possible, the same reference numbers are used in the drawings and in the following description to refer to the same features or similar features. For example, the cross-sectional views use a common designator for an illustrative number of serial bus wires. The use of a common designator for serial bus wires is representative of any of the various number, type, and functions of electrical wires employed within serial bus cables or otherwise functioning as a serial bus cable. Likewise, the use of a common designator for serial bus connectors is representative of any of the various electrical connector designs specified by public or private serial bus specifications (e.g. Universal Serial Bus Revision 2.0 Specification and Universal Serial Bus Revision 3.1 Specification).

Relative terms such as "lower" and "upper" are used herein to describe one element's relationship to another element as illustrated in the drawings. These relative terms are intended to encompass different orientations of elements in the serial bus utility strap assemblies embodied herein, and not to be restricted to the orientations or embodiments depicted in the drawings.

The term "fastening means" is used herein to describe any suitable method for attaching items or connecting materials. These "fastening means" enable the serial bus utility strap to carry loads, to bind items, or to secure articles. The embodiments illustrated herein include loops, carabiners, a hook-and-loop fastening system (e.g. Velcro®), button holes, grommets, and D-Rings. These embodiments are not exclusive of other fastening systems, e.g. buttons, buckles, or other hook-like devices. Those skilled in the related arts will realize that embodiments of this invention may incorporate any suitable fastening means or combinations of fastening means, many of which are described in Cooperative Patent Classification (CPC) subclass A44B and in CPC group F16B45/00.

The term "cable core" is used herein to describe any method of collectively securing and protecting multiple wires in a single sub-assembly, such as for durability or ease of manufacturing. The cable core may also serve to electrically isolate the various wires from each other, especially if the wires are not separately insulated. While many current art cables use different materials for a cable's core and its jacket, most current art serial bus cables use the same material as both the cable core and the cable jacket. Thus, the use of the term "cable core" is appropriate to refer to the most common current art method of combining and protecting serial bus wires. However, those skilled in the related arts will recognize that wires assembled for use in a serial bus utility strap may be bundled, secured, and protected by various similar methods, such as using a jacket or a wrapping material. Likewise, those skilled in the related arts will recognize that these assemblies may have any cross-sectional shape, but are typically round or flat.

FIG. 1A and FIG. 1B show a first embodiment of a serial bus utility strap 100. As shown in FIG. 1A and FIG. 1B, a serial bus utility strap 100 may incorporate individual electrical wires 110 encased in a strap material 120. While FIG. 1B shows the serial bus utility strap having five wires 110, consistent with embodiments of the invention, the serial bus utility strap may comprise any number of wires 110.

Further considering the electrical properties of this first embodiment of a serial bus utility strap 100, two serial bus connectors 130 are provided. The first ends of the serial bus wires 110 are each electrically bonded to a first serial bus connector 130, and the second ends of the serial bus wires 110 are each electrically bonded to a second serial bus connector 130. The connectors 130 and the wires 110 function together as a serial bus cable. While FIG. 1A shows the serial bus connectors 130 as USB-A style connectors, consistent with the embodiments of the invention, any USB, FireWire, or other serial bus connector may be connected to either end of the wires 110 in this serial bus utility strap 100.

Further considering the structural properties of this first embodiment of a serial bus utility strap 100, the strap material 120 may be a single piece of moldable plastic material, such as cross linked polyethylene or polyvinyl chloride. The serial bus cable connectors 130 are supported by and emerge from the strap material 120 in such a way as to make the connectors 130 easily accessible. To carry a load across the utility strap, each end of the strap contains a fastening means. In the embodiment in FIG. 1A, the fastening means shown at each end of the elongated strap is a loop 140 suitable for connecting to a hook, carabiner, or similar device. The loop 140 connects to the outer edges of the utility strap material 120 so that the inner portion of the utility strap material 120 experiences relatively little deformation when the serial bus utility strap 100 is under a tensile load. Because the deformation of the inner portion of the strap material 120 is limited, the strap material 120 does not excessively stress the interface between the wires 110 and the connectors 130.

Figures 2A, 2B:
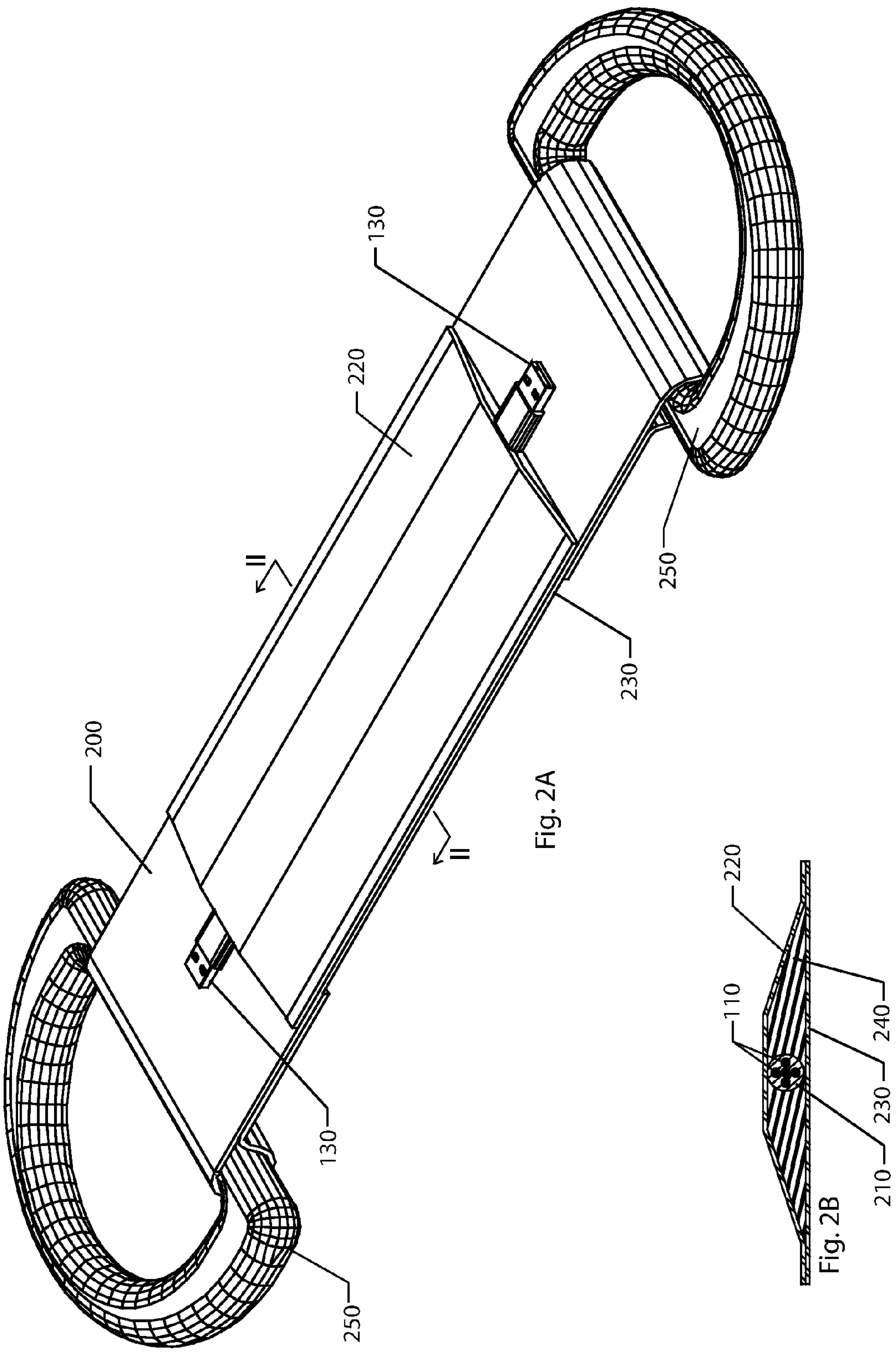
FIG. 2A shows an isometric view of a second embodiment of a serial bus utility strap.
FIG. 2B shows a cross-sectional view of the serial bus utility strap assembly shown in FIG. 2A, with the cross-section taken along the line II-II.

FIG. 2A and FIG. 2B show a second embodiment of a serial bus utility strap 200. As shown in FIG. 2A and FIG. 2B, a serial bus utility strap 200 may comprise a serial bus cable core 210 enclosing serial bus wires 110, an upper strap layer 220, and a lower strap layer 230. The serial bus utility strap may include padding 240 between the upper strap layer 220 and the lower strap layer 230. In the embodiment illustrated in FIG. 2B, the serial bus wires 110 are bundled into and protected by a cable core 210. While FIG. 2B shows the cable core 210 as enclosing five wires 110, consistent with the embodiments of the invention, the cable core 210 may enclose any number of wires 110 and is not limited to five.

Further considering the electrical properties of this second embodiment of a serial bus utility strap 200, two serial bus connectors 130 are provided. The first ends of the serial bus cable core 210 and its wires 110 are attached to a first serial bus connector 130, and the second ends of the serial bus cable core 210 and its wires 110 are attached to a second serial bus connector 130. While FIG. 2B shows a cable with a round cable core 210, other embodiments may utilize other cable configurations, such as a ribbon cable or a flexible flat cable. Likewise, while FIG. 2A shows the serial bus connectors 130 as USB-A style connectors, consistent with the embodiments of the invention, any USB, FireWire, or other serial bus connector may be connected to either end of the wires 110 in this serial bus utility strap 200.

Further considering the structural properties of this second embodiment of a serial bus utility strap 200, the upper strap layer 220 and lower strap layer 230 may be constructed of, for example, leather, cotton, nylon, cross linked polyethylene, polyvinyl chloride, polyester, or any type of material commonly used to make utility straps. In the embodiment shown in FIG. 2A, the upper strap layer 220 and the lower strap layer 230 are stitched together in such a way as to make a single utility strap assembly and to secure the serial bus cable core 210 and connectors 130 within the assembly. To carry a load across the utility strap, each end of the strap contains a fastening means, which is shown in FIG. 2A as a D-ring 250.

As shown in FIG. 2A, the upper strap layer 220 and the lower strap layer 230 separate from each other near the ends of the cable core 210 to allow the serial bus connectors 130 to protrude from the strap layers, thus enabling the serial bus connectors 130 to be readily accessible to the user. This separation of the upper strap layer 220 from the lower strap layer 230 also minimizes the elongation of the center of the upper strap layer 220 when the serial bus utility strap 200 is under a tensile load. Minimizing the elongation of the center of the upper strap layer 220 minimizes the load placed by the upper strap layer 220 on the interface between the wires 110 and the connectors 130.

Figure 3:
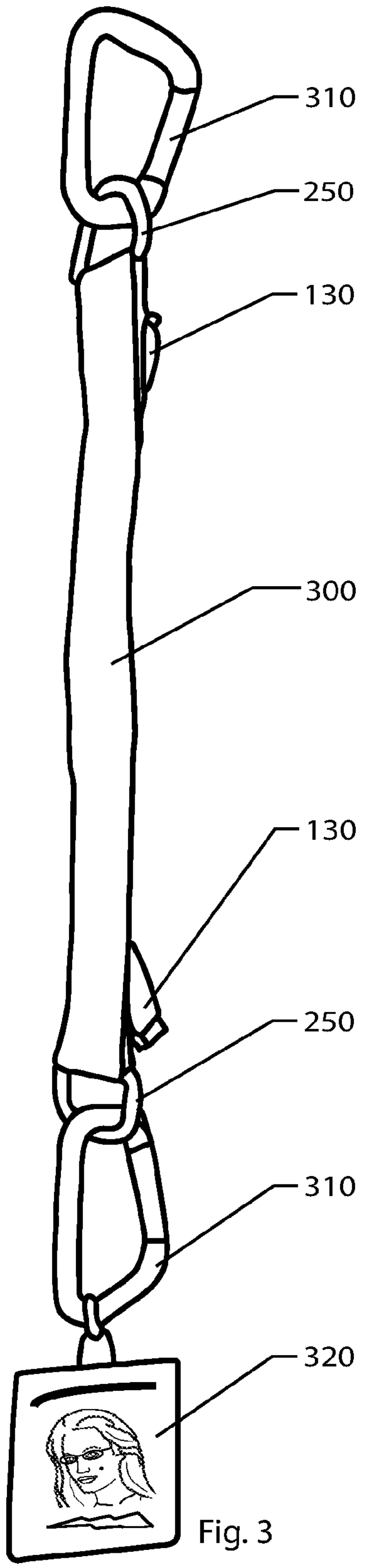
FIG. 3 shows an embodiment of the serial bus utility strap utilized as a lanyard to hold an identification badge.

FIG. 3 shows a third embodiment of a serial bus utility strap 300, and illustrates how a serial bus utility strap may be used to conveniently carry a common accoutrement such as an identity badge 320. The embodiment of FIG. 3 is similar to that of FIG. 2A and FIG. 2B, in that it is a flexible strap with multiple strap layers and with D-rings 250 at each end. In FIG. 3, a carabiner 310 is attached to each D-ring 250 to enable easy connection and removal of the serial bus utility strap 300. The upper carabiner 310 enables attaching the assembly to a person, such as to a loop on an article of clothing. An identity badge 320 is hung on the lower carabiner 310. The serial bus connectors 130 are easily accessible so that they may be used to connect electronics, especially when the serial bus utility strap 300 is removed from the carabiners 310.

Those familiar with the related arts will notice two subtle but important aspects of this embodiment. First, this embodiment uses a combination of a D-ring and a carabiner, which illustrates that combinations of fastening methods may be used in creating the load-bearing fastening ends of the Serial Bus Utility Strap. For example, those familiar with the arts will recognize that a carabiner may be connected to a grommet or (as noted in the first embodiment) to a loop. Second, while each end of the embodiment shown uses a carabiner and a separate D-ring, those familiar with the arts will recognize that other styles exist in which the clasp-like mechanism of the carabiner attaches more permanently to the ring, either as a fixed or a flexible (e.g. a swivel) connection. These minor variations remain within the scope of the illustrated embodiment.

Figures 4A, 4B, 4C:
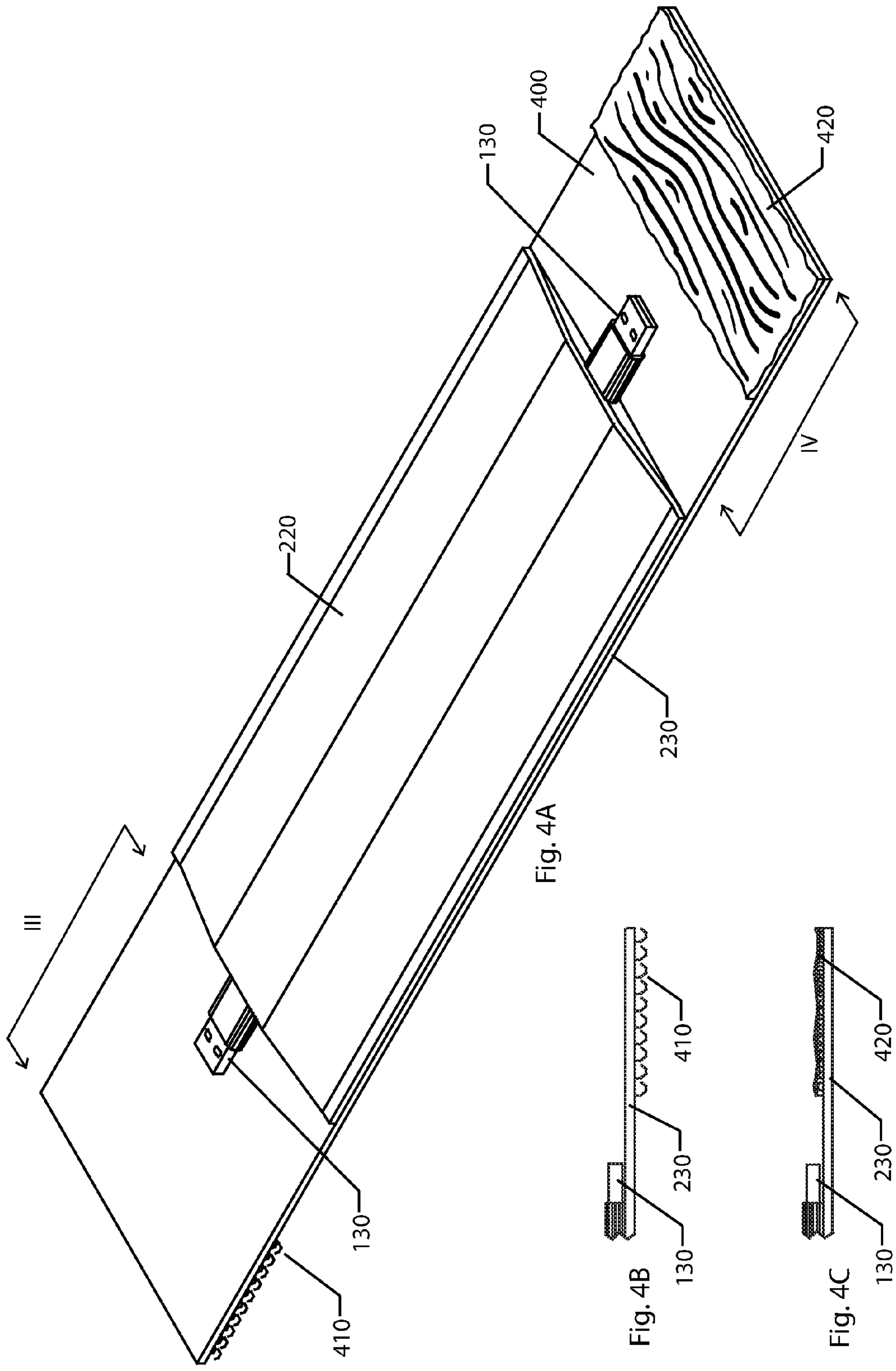
FIG. 4A shows an isometric view of a fourth embodiment of a serial bus utility strap.
FIG. 4B shows a partial side view of the fourth embodiment of a serial bus utility strap shown in FIG. 4A, with the side view corresponding to view III of FIG. 4A.
FIG. 4C shows a partial side view of the fourth embodiment of a serial bus utility strap shown in FIG. 4A, with the side view corresponding to view IV of FIG. 4A.

FIG. 4A shows a fourth embodiment of a serial bus utility strap. In this embodiment, the serial bus utility strap 400 utilizes parts of a hook-and-loop fastening system (e.g. Velcro®). The embodiment of FIG. 4A is similar to that of FIG. 2A and FIG. 2B in that it is a flexible strap with an upper layer 220 and a lower layer 230 which are stitched, glued, or fused together. As shown in FIG. 4A, the multi-hook portion 410 of a hook-and-loop fastening system is affixed to one end of the serial bus utility strap 400. This multi-hook portion 410 is further illustrated in FIG. 4B. As is also shown in FIG. 4A, the multi-loop portion 420 of a hook-and-loop fastening system is affixed to the other end of the serial bus utility strap 400. This multi-loop portion 420 is further illustrated in FIG. 4C. In the embodiment shown in FIGS. 4A-4C, the multi-hook portion 410 and the multi-loop portion 420 of the hook-and-loop fastening system are arranged such that the serial bus utility strap may be circled around and connected to itself, surrounding the intended load, objects to be bound, or objects to be carried. The locations and proportions of the hook-and-loop fastener elements in FIGS. 4A-4C are illustrative and do not exclude other configurations incorporating elements of a hook-and-loop fastening system. Similar to FIGS. 2A and 2B, two serial bus connectors 130 are provided, are connected together by wires contained in the Serial Bus Utility Strap assembly 400, and are easily accessible so that they may be used to connect external electronic devices. For illustration, the serial bus connectors 130 are shown in FIGS. 4A-4C with proportions most like a USB-A or a USB-C connector. As with other embodiments herein described, these serial bus connectors 130 may be of any USB, FireWire, USB-derived, or FireWire-derived configuration.

Figure 5:
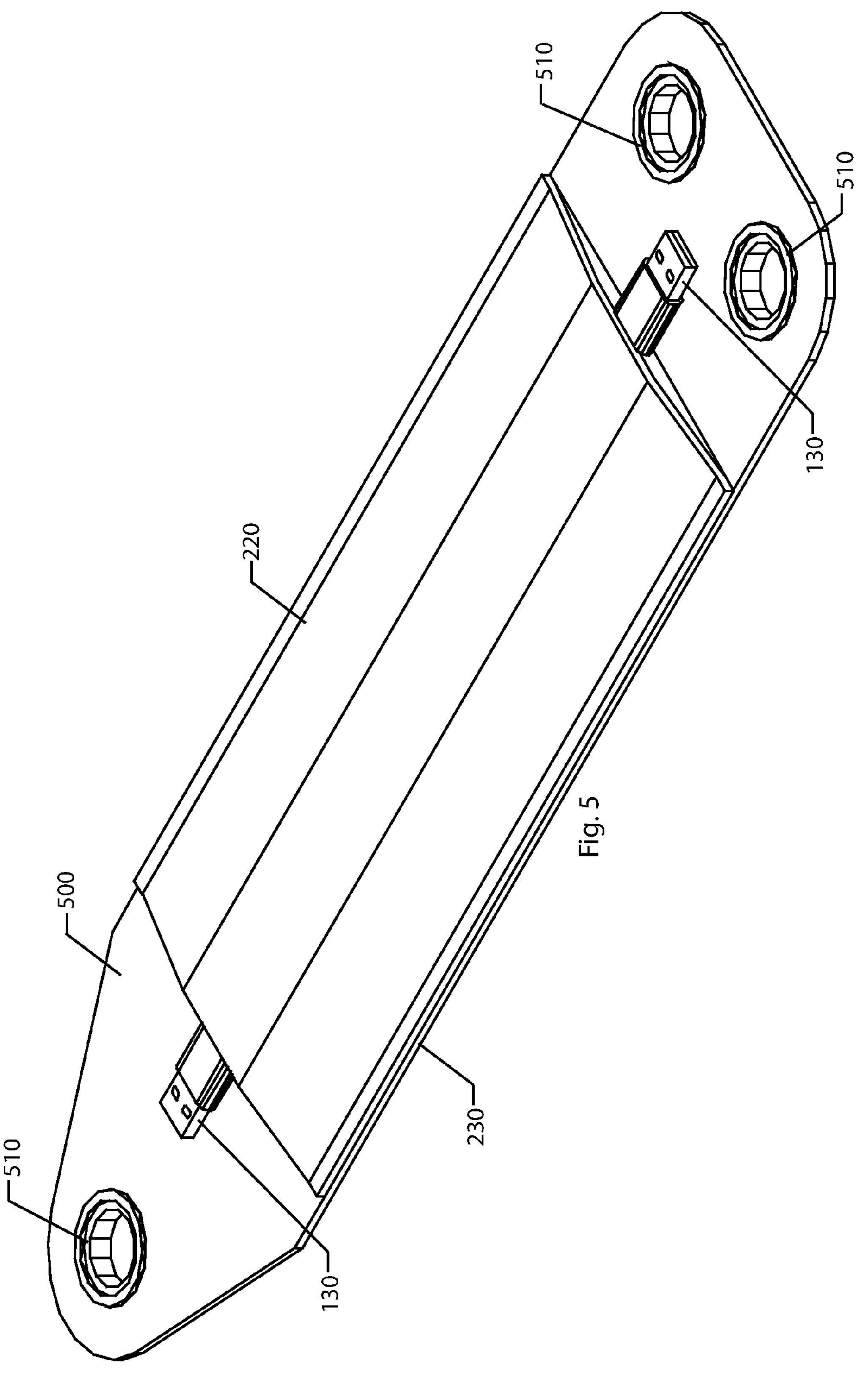
FIG. 5 shows an isometric view of a fifth embodiment of a serial bus utility strap.
Figures 6A, 6B:
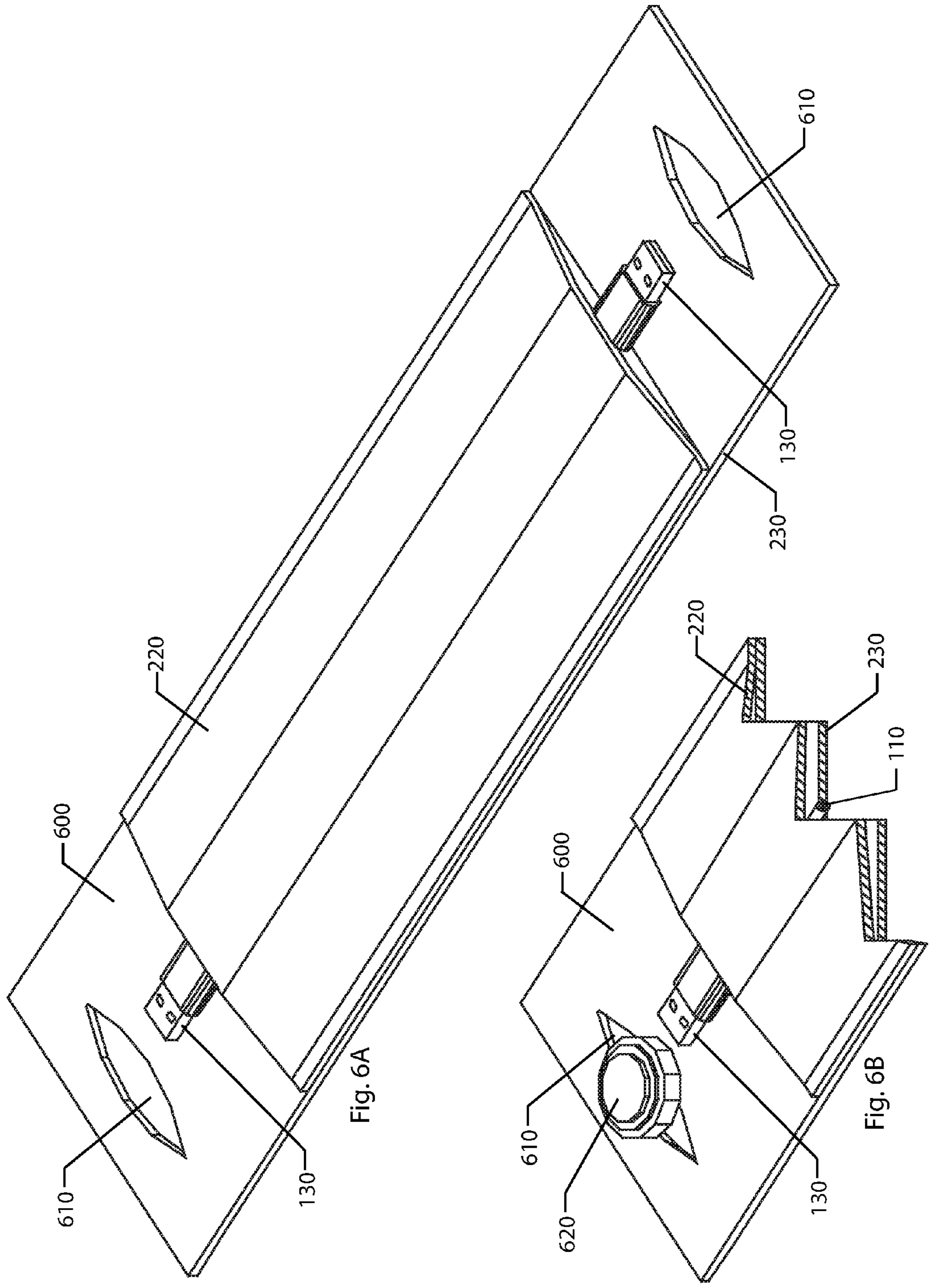
FIG. 6A shows an isometric view of a sixth embodiment of a serial bus utility strap.
FIG. 6B shows an isometric view of an end of the sixth embodiment of a serial bus utility strap, with the view detailing the attachment of a button to the button hole of the serial bus utility strap.

FIG. 5 shows a fifth embodiment of a serial bus utility strap. In this embodiment, the serial bus utility strap 500 utilizes grommets 510 as the fastening means. The embodiment of FIG. 5 is similar to that of FIG. 2A and FIG. 2B in that it is a flexible strap with an upper layer 220 and a lower layer 230 which are stitched, glued, or fused together. As shown in FIG. 5, one or more grommets 510 are affixed to each of the ends of the serial bus utility strap 500. In FIG. 5, one grommet 510 is affixed to one end of the serial bus utility strap 500 while two grommets 510 are affixed to the other end of the serial bus utility strap 500. These quantities of grommets are illustrative and do not exclude other quantities arranged in other patterns. Similar to FIGS. 2A and 2B, two serial bus connectors 130 are provided, are connected together by wires contained in the Serial Bus Utility Strap assembly 500, and are easily accessible so that they may be used to connect external electronic devices. As with other embodiments herein described, these serial bus connectors 130 may be of any USB, FireWire, USB-derived, or FireWire-derived configuration. FIG. 6A shows a sixth embodiment of a serial bus utility strap. In this embodiment, the serial bus utility strap 600 utilizes button holes 610 as the fastening means. The embodiment of FIG. 6A is similar to that of FIG. 2A and FIG. 2B in that it is a flexible strap with an upper layer 220 and a lower layer 230 which are stitched, glued, or fused together. As shown in FIG. 6A, the button holes 610 are located at either end of the device. The functionality of this button hole 610 is illustrated in FIG. 6B, which is a detail of either end of the serial bus utility strap 600 shown in FIG. 6A. As shown in FIG. 6B, a button 620 may be attached to some other device or object (omitted for clarity), then passed through the button hole 610 to transfer the load between the objects. Those familiar with the design of utility straps will readily recognize that utility straps may use one or more button holes, that buttons of various shapes or sizes may be slipped through or attached to these button holes in any of various fashions, and that the button holes may be reinforced or non-reinforced. Similar to FIGS. 2A and 2B, two serial bus connectors 130 are provided, are connected together by wires 110 contained in the Serial Bus Utility Strap assembly 600, and are easily accessible so that they may be used to connect external electronic devices. As with other embodiments herein described, these serial bus connectors 130 may be of any USB, FireWire, USB-derived, or FireWire-derived configuration.

As stated, embodiment six is similar to embodiments two through five in the use of two layers of material surrounding wires 110 in a cable core. FIG. 6B shows additional detail of the upper layer of material 220 and lower layer of material 230, and how these encase the wires 110 which carry data and/or power between the serial bus connectors 130. Unlike the embodiment in FIG. 2B, the embodiment in FIG. 6B does not employ padding between the upper layer 220 and the lower layer 230. Those familiar with the arts of utility strap design will readily understand that the inclusion (or non-inclusion) of padding in a utility strap is based upon factors such as the intended use of the utility strap, the shape of the utility strap, and the properties of the upper layer 220 and the lower layer 230.

While certain embodiments of the serial bus utility strap invention have been described herein, other embodiments may exist without departing from the scope of the novel concepts of the invention. For example, various shapes, sizes, and proportions of rings and grommets exist, and those illustrated herein are not exclusive of these other configurations. Likewise, various lengths and proportions of straps and enclosed cables may be used. Consequently, other embodiments of the invention may provide a serial bus utility strap with application to a wide range of purposes and are not limited to the examples described in this specification.

What is claimed is:

1. A flexible elongated utility strap comprising:

fabric or other flexible material suitable for carrying a load or for securing objects;

electrical wires of suitable number and size to function as a serial bus cable;

a first fastening means of suitable load-bearing strength at the first end of the elongated strap;

the first fastening means being at least one of a button hole, a ring, a loop, a carabiner, a grommet, and a portion of a hook-and-loop fastening system;

a second fastening means of suitable load-bearing strength at the second end of the elongated strap;

the second fastening means being at least one of a button hole, a ring, a loop, a carabiner, a grommet, and a portion of a hook-and-loop fastening system;

a serial bus connector being electrically connected to the first end of the electrical wires; and a serial bus connector being electrically connected to the second end of the electrical wires;

wherein the serial bus connectors are available for use as a connection between two electronic devices, electrical devices, or other serial bus cables; and wherein said serial bus connectors each comply in whole or in part with either the FireWire (IEEE Standard 1394) or Universal Serial Bus standards.

* * * * *